3,118,857
SOLID POLYOLEFIN CONTAINING AN ARYL SUBSTITUTED POLYOLEFIN AND HAVING IMPROVED CLARITY
Donald E. Carr, Bartlesville, Okla., assignor to Phillips Petroleum Company, a corporation of Delaware
No Drawing. Filed Mar. 9, 1961, Ser. No. 94,421
11 Claims. (Cl. 260—45.5)

This invention relates to normally solid polyolefins. In one aspect this invention relates to a solid polyolefin having improved light transmittibility and a method for preparing same.

It is known in the art to extrude polymers through slits or dies of small width or diameter thereby producing a film or fiber or filament depending on the shape of the die or slit. The filaments, films, and fibers produced from the various polymers have a multitude of uses such as in improved textiles, automobile upholstery, rugs, furniture covers, fishing lines, and strings for musical instruments. Films manuafctured from polyolefins are especially valuable in the packaging and wrapping arts because of their high tensile strength and other physical properties. Particularly useful are polymers of polyethylene, e.g., high density polyethylenes produced by the method described in the patent to Hogan and Banks, Patent No. 2,825,721, issued March 4, 1958. However, highly crystalline polymers of alpha olefins are frequently translucent when fabricated into films rather than transparent, thereby having a lower degree of "see-through" than desirable for some applications. A number of methods have been proposed for alleviating this difficulty including quenching the film in water immediately after the extrusion through the slit or die. However, there are limitations to the success of this quench method and to other proposed methods, particularly in the application of the method to commercial scale operations.

It is an object of this invention to provide a solid polyolefin having improved light transmittibility.

It is another object of this invention to provide a novel method for preparing a normally solid polyolefin having improved light transmittibility.

Yet another object of this invention is to provide a novel method of improving the clarity of solid polyolefin materials.

Still another object of this invention is to improve the visible light transmittibility of solid polyethylene.

Other objects and advantages will be apparent to one skilled in the art upon a study of this disclosure including the detailed description of the invention and the claims.

These and other objects of the invention are broadly accomplished by preparing a novel composition of matter comprising a normally solid polymer of an olefin containing a sufficient amount of an aryl substituted polymer of an olefin to improve the light transmittibility of said solid polymer.

The scattering of light responsible for the opacity of polyolefin materials, such as polyethylene, apparently occurs in several different ways not fully understood nor completely related. Some of the light is undoubtedly scattered at the boundaries between neighboring crystals due to the fact that there is apparently a concentration of amorphous material at the boundaries resulting in a change in the refractive index. Therefore, the degree of opacity of any particular polyolefin object would depend on such factors as the average size of the crystals, the abruptness of the boundaries in terms of refractive index differences and on the coarser features of the internal structure as well, of course, as the more manifest interrelated factor, such as thickness of sample. It has heretoforebeen determined that when the temperature of a particular polyolefin sample is raised, there is a continuous increase of light transmission up to the clarification point, which is apparently associated with the increase in proportion of amorphous material, but upon subsequent cooling the light transmission first decreases, then increases and finally decreases again—changes which are presumably associated with the aforementioned factors. In general, high density polyolefins, such as high density polyethylene, tend to be more opaque than the lower density materials apparently due to factors such as the increase in crystallinity and the tendency to form larger crystals. This invention is not limited, however, to any theory attempting to explain the improved ability of the polyolefin treated by the method of this invention to transmit visible light.

Any of the known polyolefins may have improved light transmittibility when prepared by the method of this invention. Particularly preferred are those polyolefins produced from olefin monomers having from 2 to 8 carbon atoms per molecule. The polymers used will have a density in the range from 0.890 to 0.990 gm./cc. and most preferred are those whose density is in the range 0.940 to 0.990. Suitable polymers include polymers of ethylene, propylene, 1-butene, 1-pentene, 1-hexene, 1-octene, 4-methyl-1-pentene, 4-methyl-1-hexene, 4-ethyl-1-hexene, 6-methyl-1-heptene, 5-methyl-1-heptene, 3-methyl-1-butene, 3-methyl-1-pentene, and the like. These materials can be polymerized alone or in admixture with each other to obtain solid polymers. Also these olefins can be polymerized with other aliphatic olefins such as butene-2 and butadiene. The preferred solid polyolefins include polyethylene, polypropylene, polybutylene, and copolymers of ethylene and propylene and copolymers of ethylene and butylene. For producing these polyolefins, Hogan and Banks, U.S. Patent No. 2,825,721, disclose a particularly desirable polymer because of the high molecular weights and high values of crystallinity of the produced polymers.

The shape and form of the solid polyolefin used as the major part of the composition, hereinafter referred to as the parent polymer, is virtually unlimited and includes for instance pellet, powder, plate, fluff, sheet, film, filament, and the like. It is only required that the solid polyolefin be compatible with the aryl substituted polymer of an olefin incorporated therewith so as to improve the clarity of said polyolefin.

I have now discovered that the cloudiness in polyolefin films or fibers can be eliminated or substantially reduced by the incorporation in the parent polyolefin of a small amount of an aryl-substituted polymer of an olefin prior to the extrusion of the solid polyolefin to form the film or fiber. In the preferred aspect of the invention the drawn film or filament is quenched in a fluid to solidify the extended body immediately after extruding same through the slot or die.

Aryl-substituted polymers of olefins are well known to those skilled in the art and any method known to those skilled in the art for preparing same is suitable for this invention. Conventionally, these materials, such as aromatic hydrocarbon-substituted polyethylenes, are prepared by halogenating a solid polyolefin to a halogen content of from about 4 to about 20 weight percent and then condensing this halogenated polymer with an aromatic hydrocarbon in the presence of a Friedel-Crafts type catalyst. The products thus obtained include aromatic-substituted polyolefins containing in their molecular configuration a multiplicity of phenyl, naphthyl, or anthracyl groups and aromatic nuclei substituted by a multiplicity of aromatic-substituted polyolefin chains.

The halogenated polyolefins used in the condensation reactions can be prepared from any of the solid polyolefins hereinbefore described and they may be prepared by any suitable process. It is preferred that the polyolefin used in the condensation reaction be the same material as the parent polyolefin. The halogens used include chlorine, bromine, and iodine, chlorine frequently being preferred. The halogenated polyolefin is preferably halogenated to a halogen content of between about 4 and about 20 weight percent by any of several known procedures such as solution, aqueous slurry, or dry halogenation processes. One such process is fully described in the copending application of Peter J. Canterino, Serial No. 442,891, filed July 12, 1954, now Patent No. 3,060,164. Other and improved methods are described in the copending applications of Canterino and Baptist, Serial No. 446,666, filed July 29, 1954, now Patent No. 2,920,064. The halogenated polyolefin is then condensed with an aromatic hydrocarbon in the presence of a Friedel-Crafts type catalyst. Suitable aromatic hydrocarbons include benzene, toluene, xylene, naphthalene, anthracene, and the like, with the amount used being at least stoichiometric with the halogen content of the halogenated polyolefin. The catalysts applicable are the usual Friedel-Crafts type catalysts including aluminum chloride, zinc chloride, iron chloride, aluminum bromide, boron fluoride, hydrofluoric acid, and the like.

The condensation of the aromatic hydrocarbon with the halogenated polyolefin is generally effected in a halogenated hydrocarbon diluent such as trichloroethane, tetrachloroethane, trichloroethylene, tetrachloroethylene, and the like. Similar halogenated derivatives of propane, butane, pentane, and the like can be used, if desired.

Conventional reaction temperatures vary from 100 to 250° F. with the pressure being sufficient to maintain the reaction components and/or diluent in the liquid phase. The reaction time conventionally varies from 1 to 24 hours. The aryl-substituted polymer of an olefin is then recovered by conventional means such as by filtration, washing and drying. Frequently, it is advantageous to recover portions of the low molecular weight product remaining in solution in the filtrate.

The product thus obtained is an aryl-substituted polymer of an olefin comprising high molecular weight hydrocarbon chains having in their structure a multiplicity of aromatic-substituted methylene groups represented by the general formula

in which R is an aromatic or hydrocarbon-substituted aromatic group. Satisfactory aromatic groups include phenyl, naphthyl, anthracyl, and the like, and may be substituted with one or more alkyl, cycloalkyl or aryl groups. In general, the total number of carbon atoms in the substituent groups of any single aromatic nucleus will not exceed 12. Examples of suitable radicals include 4-methylphenyl, 2,4-dimethylphenyl, 2(1-methyl-naphthyl), 4(4-ethylanthracyl), 1(2,4,5,8-tetraethylnaphthyl), 2,4-dicyclohexylphenyl, 2(4-phenylnaphthyl), and the like. The number of these groups in the hydrocarbon polymer chain is from about 0.5 to 10 per hundred carbon atoms of the unsubstituted polymer. Molecular weight of the polyolefin containing these groups is preferably at least 5000.

This aryl-substituted polymer of an olefin is combined with the parent polymer in an amount sufficient to improve the visible light transmittability of the parent polymer. Generally, this amount ranges from 0.01 to 5.0, preferably 0.1 to 2.0, weight percent of the aryl-substituted polymer based on the parent polymer.

The aryl-substituted polymer can be incorporated into the parent polymer by any suitable means known to the art. For example, the substituted material can be added to the polymer on suitable compounding mills, such as a roll mill, Banbury mixer or other suitable kneading device. In some instances, the incorporation can be effected in the extruder wherein the film is extruded.

Subsequent to thorough mixing of the substituted material with the parent material the composition is elevated in temperature to a temperature above the melting point of the composition and extruded through a slit or die to form an extended body, e.g., a film or filament. Generally, these films or filaments have a thickness or a diameter in the range of 0.01 to 100 mils or more usually 0.1 to 50 mils or more in the case of a filament. This dimension is, of course, thickness in the case of a film. Although this invention has applicability to solid polyolefins in general, maximum benefits can be obtained in solid polyolefin films or filaments having a maximum thickness of 20 mils. As can be seen from the following example, the novel composition of this invention has improved clarity or, as stated in another way, the visible light transmittibility has been improved over that of the parent material not containing the additive of this invention.

Conventionally, the film or filament leaving the extruder is quenched in a fluid having a temperature less than the solidification point of the polymer so as to rapidly effect cooling of the polymer, not only improving the clarity but also improving the molecular orientation and thus the other physical properties. Although it is within the scope of this invention to prepare the film or filament without the use of this quench step, the advantages of this invention are much more apparent when using the quench step. Although the quench temperature will vary with the polymer, in the case of a polyethylene having a density of at least 0.94 gm./cc. and a melting point of approximately 260° F., the temperature of the quenching fluid is usually less than 212° F., preferably 32° to 100° F.

While the mechanism by which this invention provides clear films or filaments is not fully understood, it is believed that the aryl-substituted polyolefin may act to retard spherulite formations and thereby contribute the advantage of increased clarity. Accordingly, the high molecular weight polyolefins so treated also have some of the other physical properties improved, thereby enhancing their usefulness in the fabrication of cable coatings, electrical insulation, and the like.

The following specific example illustrates the superior clarity of the polyolefin composition of the present invention but is not intended to limit the invention to the embodiment shown therein.

EXAMPLE

To a glass-lined reaction vessel was charged 250 milliliters of tetrachloroethane in which was dissolved 12.5 grams of chlorinated polyethylene (approximately 10 percent chlorine), 1.9 grams of naphthalene, and 0.4 gram of aluminum chloride by heating and stirring at 200° F. The system was maintained at a temperature of 200° F. with stirring for six hours, increments of 1.9 grams of naphthalene and 0.4 gram of aluminum chloride being added at the end of two and four hours. The reaction mixture was then cooled and filtered. The filtrate was evaporated to dryness and the solid residue recovered. The solid products were each washed with methanol, dilute hydrochloric acid, and water after which they were dried under vacuum at 200° F. Analysis of a sample taken from the material recovered on the filter showed a chlorine content less than 0.8 percent. Infrared examination of both solid samples gave similar spectra with bands indicative of both aromatic and aliphatic groups and no indication of a chlorine to carbon bond. Two types of aromatic bands were noted indicative of the presence of alpha and beta naphthyl groups. Since the parent polymer contained 10 percent chlorine, an average of approximately 4.5 chlorine atoms per hundred carbon atoms and the product was substantially free of combined chlorine, it follows that the product contained an average of about 4.5 naphthyl groups per hundred carbon atoms, or in other words, 4.5 aromatic substituted methylene groups per hundred carbon atoms in the parent polymer chain.

High density polyethylene having a density [a] of 0.96 and a melt index [b] of 0.9 was blended with 1 part per hundred of the product recovered on the filter in the foregoing run, mixing being done on a roll mill at about 300° F. for about ten minutes. Films having a film thickness of approximately 8–9 mils were formed from this blend by compression molding between chrome plated steel sheets in a hydraulic press. One of these (No. 1) was allowed to cool three hours in the press, a second (No. 2) was quenched in tap water at a temperature of about 50° F., and a third (No. 3) in ice water. To serve as controls, films were made in the same manner from the same polyethylene but without the additive of the invention. These films were tested for haze and "see-through."

The "see-through" tests were made by two procedures, designated as A and B. In the A tests, the operator held the film one foot in front of the eye and noted the distance at which the "20–20" line of an optical chart could be read. In the B tests, the film was positioned one foot in front of the "20–20" line and the distance at which the line could be read noted. Data on these tests are set forth in Table I.

Table I

| Film No. | 1 | | 2 | | 3 | |
|---|---|---|---|---|---|---|
| | Test | Control | Test | Control | Test | Control |
| Appearance | Cloudy | Cloudy | Clear | Cloudy | Clear | Cloudy [2] |
| Haze, percent [1] | 93 | 92 | 87 | 80 | 76 | 60 |
| See through A, ft | 1/12 | 1/12 | 12 | 1/12 | 11 | 8 |
| See through B, ft | 0 | 0 | 12 | 1/12 | 16 | 6 |

[1] Obtained by ASTM D-1003-52.
[2] Clear to slight cloud.

It will be readily seen from the above data that the incorporation of a small amount of an aryl-substituted polyethylene improves the visible light transmittibility of the parent polyolefin.

While certain examples, structures, compositions and process steps have been described for purposes of illustration the invention is not limited to these. Variation and modification within the scope of the disclosure and the claims can be readily effected by those skilled in the art.

What I claim is:

1. A composition comprising a normally solid polymer of an olefin selected from the group consisting of olefins having 2 to 8 carbon atoms per molecule and an aryl

---

[a] Density as used herein was determined by compression molding a slab of the polymer, cooling said molding at a temperature reduction rate of 15 to 20° F. per minute at room temperature, cutting a pen-sized specimen therefrom, and placing said specimen in a 50-ml. glass-stoppered graduate. Carbon tetrachloride and methyl cyclohexane were added to the graduate from burettes in proportion such that the specimen was suspended in the solution. During the addition of the liquids the graduate was shaken to secure thorough mixing. When the mixture just suspended the specimen, a portion of the liquid was transferred to a small test tube and placed on the platform of a Westphal balance and the glass bob lowered therein. With the temperature shown by the thermometer in the bob in the range 73 to 78° F., the balance was adjusted until the pointer was at zero. The value shown on the scale was taken as the specific gravity.

[b] For melt index the method of ASTM D-1238-52T was used with five runs being run at 2-minute intervals, averaging the five weights, discarding any values which deviated from the average by more than 5 weight percent, reaveraging and multiplying by 5 to obtain the amount of extrudate in 10 minutes. If the melt index was low, such as less than 1.0, the high load melt index was obtained by ASTM D-1238-57T (procedure 5) using a weight of 21,600 grams.

--- substituted polymer of an olefin containing aromatic-substituted methylene groups having the formula

wherein R is selected from the group consisting of aromatic groups and hydrocarbon substituted aromatic groups wherein the total number of carbon atoms in the substituent groups on an aromatic nucleus does not exceed 12.

2. The composition of claim 1 wherein the amount of aryl substituted polymer is in the range of 0.01 to 5.0 weight parts per 100 parts of said solid polymer.

3. A composition comprising a normally solid polymer of ethylene and an amount in the range of 0.01 to 5.0 weight percent per 100 parts of said solid polymer of a naphthyl-substituted polymer of ethylene.

4. The composition of claim 3 wherein the number of naphthyl groups per 100 carbon atoms in the polymer chain is in the range of 0.5 to 10.

5. A composition comprising polyethylene having a specific gravity in the range 0.94 and 0.99 and between about 0.1 to 2.0 weight parts based on weight parts of said polyethylene of a naphthyl-substituted polyethylene.

6. The composition of claim 5 wherein said naphthyl-substituted polyethylene has been prepared by condensing a chlorinated polyethylene having from about 4 to about 20 weight percent chlorine and naphthalene in the presence of a Friedel-Crafts type catalyst.

7. A process for improving the light transmittibility of a normally solid polymer of an olefin selected from the group consisting of olefins having 2 to 8 carbon atoms per molecule comprising incorporating in said solid polymer an aryl-substituted polymer of an olefin containing aromatic-substituted methylene groups having the formula

wherein R is selected from the group consisting of aromatic groups and hydrocarbon substituted aromatic groups wherein the total number of carbon atoms in the substituent groups on an aromatic nucleus not exceeding 12, heating the resultant admixture to above the melting point of said solid polymer, forming from said heated admixture and extended body and solidifying by cooling below the solidification point of said solid polymer.

8. The process of claim 7 wherein the number of naphthyl groups per 100 carbon atoms in the polymer chain is in the range of 0.5 to 10.

9. The process of claim 7 wherein the amount of aryl substituted polymer is in the range of 0.1 to 5.0 weight parts based on said solid polymer.

10. The process of claim 7 wherein said polyethylene has a specific gravity in the range of 0.940 to 0.990.

11. The process of claim 7 wherein said naphthyl-substituted polyethylene has been prepared by condensing a chlorinated polyethylene having from about 4 to about 20 weight percent chlorine and naphthalene in the presence of a Friedel-Crafts type catalyst.

References Cited in the file of this patent

UNITED STATES PATENTS

| 2,692,259 | Peters | Oct. 19, 1954 |
| 2,819,328 | Brown et al. | Jan. 7, 1958 |
| 2,824,145 | McCall et al. | Feb. 18, 1958 |
| 2,949,492 | Weaver | Aug. 16, 1960 |
| 2,956,035 | Mock | Oct. 11, 1960 |
| 2,966,474 | Jurgeleit | Dec. 27, 1960 |